(12) United States Patent
Wang et al.

(10) Patent No.: US 7,391,933 B2
(45) Date of Patent: Jun. 24, 2008

(54) METHOD AND APPARATUS FOR IMAGE INTERPOLATION BASED ON ADAPTIVE POLYPHASE FILTERS

(75) Inventors: Xianglin Wang, Santa Ana, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 693 days.

(21) Appl. No.: 10/697,358

(22) Filed: Oct. 30, 2003

(65) Prior Publication Data

US 2004/0091174 A1    May 13, 2004

(51) Int. Cl.
*G06K 9/32* (2006.01)
*G06K 9/40* (2006.01)
*G06K 9/36* (2006.01)
*H04N 7/01* (2006.01)
*G06F 7/38* (2006.01)

(52) U.S. Cl. .................. 382/300; 382/263; 382/264; 382/276; 348/441; 708/290

(58) Field of Classification Search ................ 382/276, 382/277, 278, 293, 298, 299, 300
See application file for complete search history.

(56) References Cited

U.S. PATENT DOCUMENTS

| | | | | |
|---|---|---|---|---|
| 4,468,693 A | | 8/1984 | Fujita et al. ............. 358/525 |
| 5,008,752 A | | 4/1991 | Van Nostrand .......... 348/581 |
| 5,038,388 A | * | 8/1991 | Song ....................... 382/266 |
| 5,054,100 A | | 10/1991 | Tai .......................... 382/300 |
| 5,070,465 A | * | 12/1991 | Kato et al. ............... 345/441 |
| 5,257,326 A | * | 10/1993 | Ozawa et al. ........... 382/300 |
| 5,327,257 A | | 7/1994 | Hrytzak et al. ......... 358/447 |
| 5,774,601 A | * | 6/1998 | Mahmoodi ............. 382/298 |
| 5,889,895 A | | 3/1999 | Wong et al. ............ 382/300 |
| 5,953,465 A | | 9/1999 | Saotome ................. 382/300 |
| 5,959,693 A | * | 9/1999 | Wu et al. ................ 348/624 |
| 6,175,659 B1 | | 1/2001 | Huang .................... 382/266 |
| 6,411,305 B1 | * | 6/2002 | Chui ....................... 345/660 |
| 6,424,749 B1 | * | 7/2002 | Zhu et al. ............... 382/260 |
| 6,535,651 B1 | | 3/2003 | Aoyama ................. 382/300 |
| 6,574,365 B1 | * | 6/2003 | Weldy ..................... 382/167 |
| 6,701,024 B1 | * | 3/2004 | Sasai ....................... 382/260 |
| 6,724,832 B1 | * | 4/2004 | Hershberger ........... 375/301 |
| 6,795,587 B2 | * | 9/2004 | Slavin .................... 382/260 |
| 6,975,354 B2 | * | 12/2005 | Glotzbach et al. ...... 348/273 |

(Continued)

*Primary Examiner*—Jingge Wu
*Assistant Examiner*—José M Torres
(74) *Attorney, Agent, or Firm*—Kenneth L. Sherman, Esq.; Michael Zarrabian, Esq.; Myers Dawes Andras & Sherman, LLP (57) ABSTRACT

An interpolation system interpolates image positions in an original image to produce an interpolated output image, wherein the original image is represented by digital input pixel data. A first filter with a sharp interpolation characteristic, that interpolates a selected image position in the image to generate a sharp interpolation output value. A second filter having a smooth interpolation characteristic, that interpolates the selected image position in the image to generate a smooth interpolation output value. A controller that calculates a weighting coefficient for the output of each filter. And, a combiner selectively combines the output values from the filters as a function of the weighting coefficients, to generate an interpolation output value for the selected image position of an interpolated output image.

10 Claims, 5 Drawing Sheets

U.S. PATENT DOCUMENTS 7,092,020 B2 * 8/2006 Yoshikawa ................. 348/280
2002/0067862 A1 * 6/2002 Kim ........................... 382/266
2003/0185463 A1 * 10/2003 Wredenhagen et al. ..... 382/300

* cited by examiner

METHOD AND APPARATUS FOR IMAGE INTERPOLATION BASED ON ADAPTIVE POLYPHASE FILTERS

FIELD OF THE INVENTION

The present invention relates to image interpolation, an in particular to image interpolations using polyphase filters.

BACKGROUND OF THE INVENTION

Image interpolation is widely used in applications such as video deinterlacing, video scaling, etc. in digital TV systems. An effective image interpolation technique is important for the overall image quality in a digital TV system. There are image interpolation techniques that generate a sharp image, but they give rise to ringing artifacts around sharp edges. And, existing techniques that generate a smooth image without ringing artifacts, tend to smooth the sharpness of edges and make the edges blurring.

In order to solve those problems, some adaptive image interpolation techniques have been proposed, such as in U.S. Pat. No. 4,468,693, that provide an interpolation method based on a manually operated switch for switching between different interpolation algorithms depending on the type of image being interpolated. However, such a manual operation is not suitable for a digital TV system.

In another example, U.S. Pat. No. 5,008,752 provides several interpolation kernels including cubic convolution, bilinear and nearest neighbor interpolation that are selected by a control unit based on the difference between two neighboring image pixel values. Such a control unit can be sensitive to image noise. In addition, bilinear and nearest neighbor interpolation methods generally produce too smooth interpolated images.

In another example, U.S. Pat. No. 5,327,257 provides a technique whereby an image is interpolated by combining a sharp result and a smooth result based on a scaling factor with a value from 0 to 1. In this method, 2D filters are used to obtain a sharp result and a smooth result from the original image. The scaling factor is calculated based on lookup tables according to local image contrast and image density. For a given application, this method requires that the contrast and density lookup tables be predetermined and stored in system memory.

Yet in another example, U.S. Pat. No. 6,535,651 provides a method of interpolating images depending on whether a new image pixel belongs to an edge area or a flat image area. In order to accurately check if a pixel belongs to an edge area as well as the direction of the edge, a relatively complicated mechanism is required.

Polyphase filters have been widely used for image interpolation purposes due to their computation simplicity and good performance. Generally, a polyphase filter used for digital signal interpolation comprises a low pass filter having a cutoff frequency determined by the interpolation ratio. For example, to expand a digital signal L times, a low pass filter with a cutoff frequency of 1/L can be used. The referred frequency is normalized where the normalized frequency value of 1 corresponds to half sampling frequency. The low pass filter used in this case can be separated into L sub-filters, with each sub-filter used for a different phase of interpolation. More detailed explanation of the polyphase filter concept can be found in "*Multirate Systems and Filter Banks*", P. P. Vaidyanathan, Prentice Hall, 1993, incorporated herein by reference.

Figure 1A:
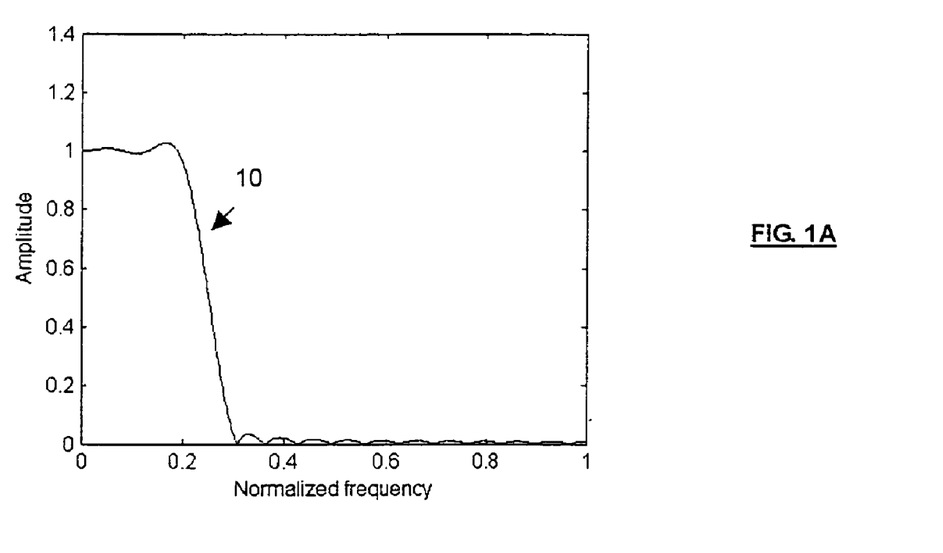
FIG. 1A is an example frequency response of a sharp filter that can be used for image interpolation.

However, such existing image interpolation techniques based on polyphase filters have similar problems mentioned above. This is because when the filter is designed to have a sharp frequency transition band, it provides a sharp interpolated image. But it also generates ringing artifacts around sharp edges. FIG. 1A shows an example frequency response 10 of a low pass filter with a sharp frequency transition band.

Figure 1B:
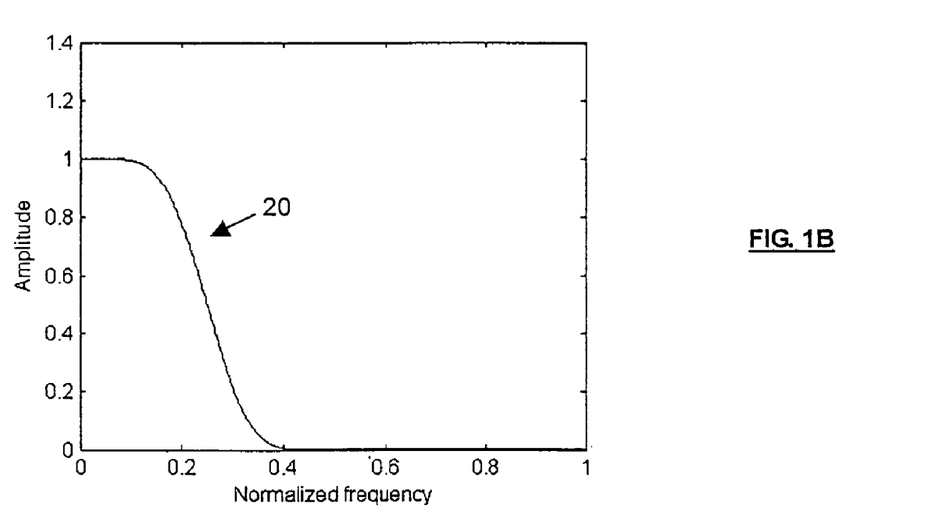
FIG. 1B is an example frequency response of a smooth filter that can be used for image interpolation.

When the filter is designed to have a smooth frequency transition band, it provides a smooth interpolated image without ringing artifacts. However, the filter tends to smooth and blur the sharpness of edges. FIG. 1B shows an example frequency response 20 of a low pass filter with a smooth frequency transition band. The filters in FIGS. 1A-B, are both 8 tap 4 phase polyphase filters with a cutoff frequency of ¼. When they are used for image interpolation, they generate the undesirable results as mentioned above.

BRIEF SUMMARY OF THE INVENTION

The present invention addresses the above problems. Accordingly, in one embodiment the present invention provides a method and system for reproducing an original image as an interpolated output image in which the original image is represented by digital input pixel data. Two polyphase filters are used to interpolate a selected image position, and the output of the two filters are selectively combined to achieve a better image interpolation result. A controller is designed based on local image high-frequency levels and used to adaptively select or combine the filter output values, so that the image interpolation artifacts mentioned above can be avoided.

The two filters are designed as low pass filters with a cutoff frequency that is directly related to the number of phases of the filter. According to said embodiment of the present invention, the polyphase filters comprise one-dimensional (1D) finite impulse response (FIR) digital filters. Using a one-dimensional filter, a two dimensional image interpolation can be achieved by interpolation along horizontal direction and vertical direction separately.

In one example, one of the filters comprises a "sharp filter" having a sharp frequency transition band, and the other filter comprises a "smooth filter" having a smooth frequency transition band. The sharp filter and the smooth filter have different characteristics for image interpolation. The output from the sharp filter preserves the sharpness of the original image edge. However, it generates some ringing artifacts in smooth image areas that have a sharp edge in the vicinity. The output from the smooth filter has no ringing artifact, but originally sharp edges tend to be smoothed and blurred. Therefore, according to the present invention, the functions of the two filters are adaptively (selectively) combined to avoid those artifacts. As such, for a given interpolation position in a video image frame, both the sharp filter and the smooth filter are applied. Then the filtering output values from the two filters are adaptively combined to obtain an interpolation value for the given pixel location.

To adaptively combine the two filter outputs, weighting coefficients are calculated for each of the filter outputs, based on an estimation of local image high frequency level. In one estimation example, for a given interpolation position, the neighboring original image pixels at locations/positions that are within the filtering range of interpolation, are checked. The image high frequency is calculated at these original pixel locations, and used to estimate the image high frequency level at the given interpolation position. Then, the weighting coefficients are determined based on the estimation results.

As such, if image high frequency level at the given interpolation position is estimated high, the output from the sharp filter is given more weight in determining the interpolation value for the given location. Otherwise, the output from the smooth filter is given more weight. Through such an example adaptive combination of the filter output values from a sharp filter and a smooth filter in the interpolation process, the sharpness of image edges can be well preserved without introducing either blurring edge artifacts or ringing artifacts.

Other objects, features and advantages of the present invention will be apparent from the following specification taken in conjunction with the following drawings.

DETAILED DESCRIPTION OF THE INVENTION

In one embodiment the present invention provides an image interpolation method and apparatus that utilizes polyphase filters and adaptively selects and/or combines their outputs to achieve a better image interpolation result. As noted, a control strategy is provided to adaptively select or combine the filter output values based on local image high-frequency levels, so that the image interpolation artifacts mentioned above can be avoided.

According to polyphase filter theory for image interpolation, the filters are designed as low pass filters with a cutoff frequency that is directly related to the number of phases of the filter. According to said embodiment of the present invention, the polyphase filters comprise one-dimensional (1D) finite impulse response (FIR) digital filters. Using a one-dimensional filter, a two dimensional image interpolation can be achieved by interpolation along horizontal direction and vertical direction separately.

As such, an example image interpolation method according to the present invention utilizes two polyphase filters. One of the filters comprises a "sharp filter" having a sharp frequency transition band, and the other filter comprises a "smooth filter" having a smooth frequency transition band. The sharp filter and the smooth filter have different characteristics for image interpolation. The output from the sharp filter preserves the sharpness of the original image edge. However, it generates some ringing artifacts in smooth image areas that have a sharp edge in the vicinity. The output from the smooth filter has no ringing artifact, but it can smooth and blur the sharpness of edges. Therefore, according to the present invention, the functions of the two filters are adaptively (selectively) combined to avoid those artifacts. As such, for a given interpolation position in a video image frame, both the sharp filter and the smooth filter are applied. Then the filtering output values from the two filters are adaptively combined to obtain an interpolation value for the given pixel location.

To adaptively combine the two filter outputs, weighting coefficients are calculated for each of the filter outputs, based on an estimation of local image high frequency level. In one estimation example, for a given interpolation position, the neighboring original image pixels at locations/positions that are within the filtering range of interpolation are checked. The image high frequency is calculated at these original pixel locations, and used to estimate the image high frequency level at the given interpolation position. Then, the weighting coefficients are determined based on the estimation results.

As such, if image high frequency level at the given interpolation position is estimated high, the output from the sharp filter is given more weight in determining the interpolation value for the given location. Otherwise, the output from the smooth filter is given more weight. Through such an example adaptive combination of the filter output values from a sharp filter and a smooth filter in the interpolation process, the sharpness of image edges can be well preserved without introducing either noticeable blurring edge artifacts or ringing artifacts.

Figure 2:
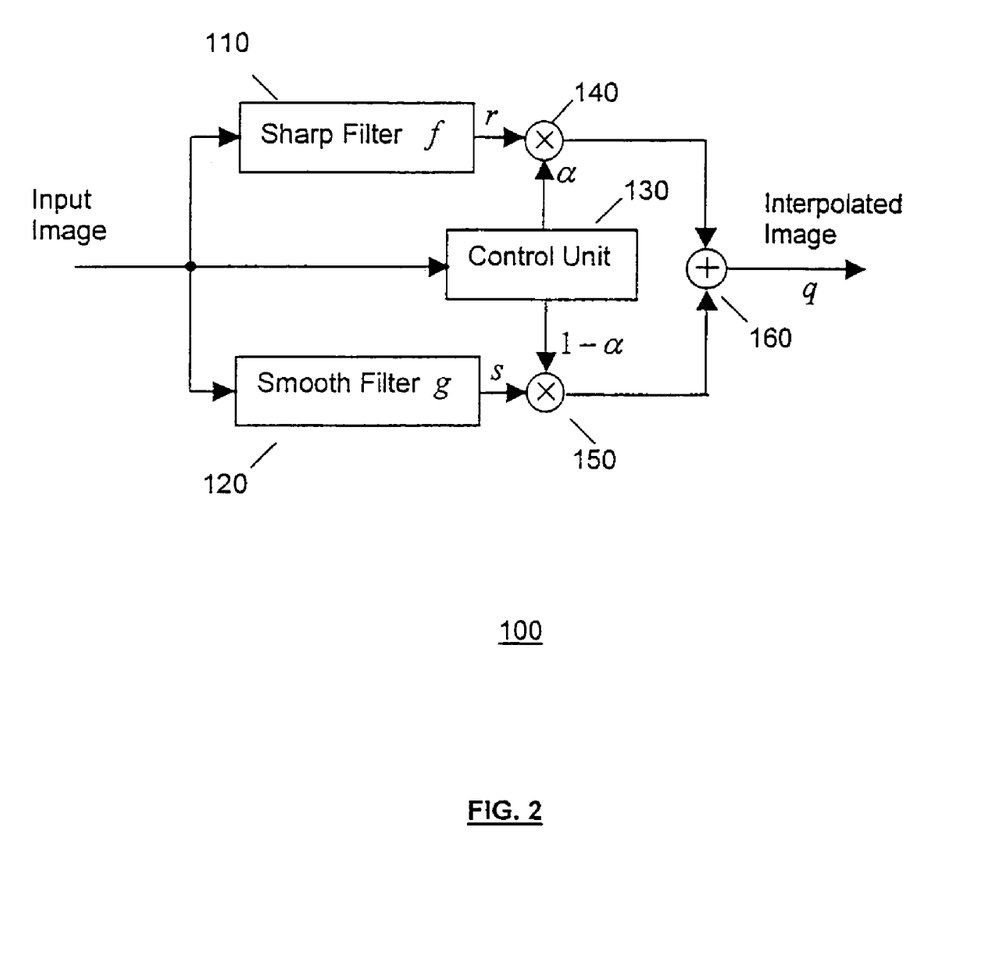
FIG. 2 is a functional block diagram for an image interpolation system according to an embodiment of the present invention.

FIG. 2 shows a functional block diagram of an example interpolation system 100 that implements the above method according to an embodiment of the present invention. The system 100 comprises a sharp polyphase filter 110 (denoted as f), a smooth polyphase filter 120 (denoted as g) and a control unit 130. Both the sharp polyphase filter 110 and the smooth polyphase filter 120 are 1D low pass FIR digital filter. The sharp filter 110 has a sharp frequency transition band and the smooth filter has a smooth frequency transition band. The sharp filter 110 provides sharp interpolation results with good edge quality, but it also causes some ringing artifacts in smooth image areas that have a sharp edge in the vicinity. The smooth filter 120 does not cause ringing artifacts, however, it may smooth and blur the sharpness of edges. The control unit 130 generates said weighting coefficients that are applied to the output from each of the polyphase filters 110, 120, using combiners (e.g., multipliers) 140 and 150, respectively, to generate weighted filter output values. Then, the two weighted filter output values are combined (e.g., added) together using a summing node 160 to provide the interpolation value for a given position.

According to the example described herein, the sharp filter 110 and the smooth filter 120 are 1D, FIR, polyphase filters. Each of the filters 110 and 120 comprises a group of sub-filters, wherein each sub-filter is used for a different phase of interpolation. Assuming each of the filters 110 and 120 is a N tap, M phase polyphase filter, then each of the filters 110 and 120 has a filter length of L=N*M, which can be sub-divided into M sub-filters. For example, the sub-filters of the filter 110 are denoted as $f^j$, j=0,1, ... M−1, wherein j is the interpolation phase. Likewise, the sub-filters of the filter 120 are denoted as $g^j$, j=0,1, ... M−1. The filter length of each sub-filter $f^j$ or $g^j$ is N.

The value of N can be an odd or even integer. When N is an even number, sub-filter coefficients can be denoted as $f_i^j$ and $g_i^j$, where $$i = -\frac{N}{2} + 1, \ldots, 0, \ldots, \frac{N}{2}.$$

When N is an odd number, sub-filter coefficients can be denoted as $f_i^j$ and $g_i^j$ wherein $$i = -\frac{N-1}{2}, \ldots, 0, \ldots, \frac{N-1}{2}.$$

For simplicity of explanation in the example described herein, the value of N is assumed to be an even number.

For image interpolation with a fixed and integer ratio, the value of M can be simply set equal to the interpolation ratio. However, for an image interpolation application that requires arbitrary or variable interpolation ratios, M should be designed large enough to provide a proper interpolation resolution. The number of phases of a polyphase filter determines the number of essentially different interpolation values that can be generated between two neighboring original image pixels. With a phase value of M, a polyphase filter can interpolate M−1 essentially different interpolation values between each two neighboring original image pixels. Therefore, with a larger value of M, the filter can provide better interpolation resolution. In one example, a phase value larger than 10 is used for digital TV related applications. With a good interpolation resolution, a given interpolation position can be approximated by an interpolation phase that is closest to it.

According to the example described herein, it can be assumed that the image pixel data input to the system 100 is a one dimensional data stream. As such, image interpolation is conducted along horizontal direction and vertical direction separately. If the length of the sub-filters is N (N is assumed to be an even number), for a given interpolation position, the original pixel samples within the filtering range of interpolation can be denoted as $$p_i, i = -\frac{N}{2} + 1, \ldots, 0, \ldots, \frac{N}{2}.$$

Figure 3:
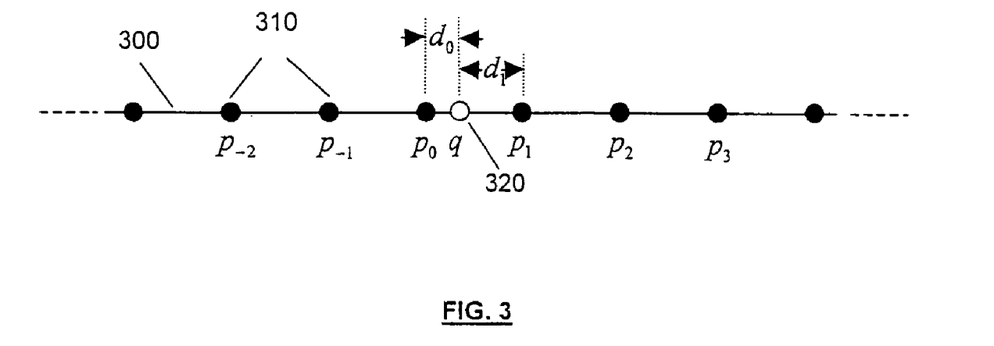
FIG. 3 shows an example interpolation position and the neighboring original image samples in an image line (or column) within an image frame, that can be used for the interpolation at the given position.

FIG. 3 shows such one dimensional image data to be interpolated. It can be either part of an image line or column 300, comprising pixels 310 (solid circles). FIG. 3 depicts an interpolation position q 320 (hollow circle) and the neighboring original image pixels 310 in an image line or column 300, that can be used for the interpolation at the given position. For the example in FIG. 3, the value N is assumed to be 6 for the given interpolation position 320. The two closest neighboring original pixels 310 for the given interpolation position 320 are $p_0$ and $p_1$. The six pixels within the filtering range for the given position 320 are $p_i$, i=−2,−1,0,1,2,3. For description simplicity, $p_i$ is used to refer both a pixel's location and value in the following. Similarly, q is used to refer both an interpolation position and the interpolation value at that position.

Assuming the interpolation phase for the given position q is j, (0≦j<M), the output values r and s from the sharp filter 110 and the smooth filter 120 (FIG. 2), respectively for the position q, can be expressed according to relations (1) and (2) below:

$$r = \sum_{i=-\frac{N}{2}+1}^{\frac{N}{2}} (f_{-i+1}^j * p_i) \quad (1)$$

$$s = \sum_{i=-\frac{N}{2}+1}^{\frac{N}{2}} (g_{-i+1}^j * p_i) \quad (2)$$

In relations (1) and (2), filter coefficients of both $f^j$ and $g^j$ are assumed to be normalized (i.e., the sum of filter coefficients of either $f^j$ or $g^j$ is equal to 1).

Referring back to FIG. 2, the weighting coefficients generated by the control unit 130 are combined with the filter output values r and s. The final interpolation value q of the interpolation position 320 (FIG. 3) is performed according to the example relation (3) below:

$$q = r * \alpha + s * (1-\alpha) \quad (3)$$

wherein α and (1−α) are the weighting coefficients generated by the control unit 130 for the sharp filter 110 and the smooth filter 120, respectively (0≦=≦1).

In relation (3) above, when α takes a value of 1, the interpolation value q will be equal to the sharp filter output r, which may contain ringing artifacts around sharp image edge area. When α takes a value of 0, the interpolation value q will have the same value as the smooth filter output s, which may have smoothed or blurred edge artifacts. According to the present invention, the values r and s are adaptively combined to essentially eliminate those artifacts, based on the value of α calculated by the control unit 130.

In this example implementation, determination of the value of α in the control unit 130 is based on an estimation of image high frequency level at the given interpolation position 320. The estimation can be obtained through the image high frequency components calculated at original pixel locations 310 neighboring the interpolation position 320. In one case, only the two closest original pixel locations to the given interpolation position 320 are considered. In another case, all the original pixel locations that are within the filtering range of interpolation to the given interpolation position can be considered. In general, other number of neighboring pixel positions on the current image line (or column), and even some pixel positions from neighboring image lines (or columns) may be used.

As such, in FIG. 3, at an original pixel location $p_i$, the image high frequency level φ can be measured through a high-pass filtering process (e.g., using a high-pass FIR filter). For example, image high frequency level φ can be simply measured according to the relation:

$$\phi_i = |p_i - 0.5 * (p_{i-1} + p_{i+1})| \quad (4)$$

wherein the high pass filter is a 3-tap FIR filter with coefficients of {−½, 1,−½}.

In a simple method, image high frequency level at the given interpolation position 320 is estimated based on the high frequency components calculated at the two closest original pixel locations to the given interpolation position. As shown in FIG. 3, when the length N of a sub-filter is an even number value, the two closest original pixels to the interpolation position 320 are $p_0$ and $p_1$. Assuming that the distances between the given interpolation position and its two closest original pixels are $d_0$ and $d_1$ respectively, and that the distance between neighboring original samples is 1, such that:

$$d_0+d_1=1 \quad (5)$$

then, image high frequency components $\phi_0$ and $\phi_1$ at pixel location $p_0$ and $p_1$, respectively, can be calculated according to relation (4) above. Then, based on the values of $\phi_0$, $\phi_1$ and $d_0$, $d_1$, an estimation of the image high frequency level, $\Phi$, can be further calculated according to the relation:

$$\Phi=d_1*\phi_0+d_0*\phi_1 \quad (6)$$

wherein $\Phi$ is used as an estimation of the image high frequency level at the given interpolation position 320.

In another embodiment, the image high frequency level at the given interpolation position 320 can be estimated based on the high frequency components calculated at all the original pixel locations, within the filtering range of interpolation to the given position. In the example shown in FIG. 3, when the polyphase filter includes 6 taps, the pixels $p_i$, i=−2,−1,0, 1,2,3 are within the filtering range to the interpolation position 320. In general, when the polyphase filter has N taps (N is an even number), then pixels $$p_i, i = -\frac{N}{2}+1, \ldots, 0, \ldots, \frac{N}{2},$$

are all the pixels within the filtering range. Accordingly, image high frequency component $$\phi_i, i = -\frac{N}{2}+1, \ldots, 0, \ldots, \frac{N}{2},$$

can be calculated using relation (4) above. Then the value of $\Phi$ can be calculated according to relation:

$$\varphi = \sum_{i=-\frac{N}{2}+1}^{\frac{N}{2}} (0.5*(f^j_{-i+1}+g^j_{-i+1})*\phi_i) \quad (7)$$

wherein j is the interpolation phase for the given interpolation position and $0 \leq j < M$, and M is the number of phases of the polyphase filters 110 and 120.

The value of $\Phi$ estimated through either relation (6) or (7), can reflect the image high frequency level around the given interpolation position. If $\Phi$ has a relatively large value, then there is rich image high frequency around the interpolation position 320. In this case, the output from the sharp filter 110 should be given more weight in calculating the interpolation value for the given position so that edges can be better interpolated without being smoothed or blurred. On the other hand, if $\Phi$ has a relatively small value, it means that the given interpolation position 320 is in a flat image area. In this case, the output from the smooth filter 120 should be given more weight in calculating the interpolation value so that ringing artifacts can be avoided.

Once the estimation of the image high frequency level $\Phi$ around the given interpolation position is available, the weighting coefficient $\alpha$ can be calculated according to the relation:

$$\alpha=\min(1, \max(0,(\Phi-T_1)/(T_2-T_1))) \quad (8)$$

wherein $T_1$ and $T_2$ are two pre-determined threshold values ($T_2 > T_1 \geq 0$). According to relation (8), when the value of $\Phi$ is greater than $T_2$, then $\alpha$ takes a value of 1. In this case, the output from the sharp filter 110 is used as the interpolation value for the given interpolation position 320. When the value of $\Phi$ is smaller than $T_1$, then $\alpha$ takes a value of 0. In this case, the output from the smooth filter 120 is used as the interpolation value for the given position. And, when the value of $\Phi$ is between $T_1$ and $T_2$, then $\alpha$ takes a value between 0 and 1. In this case, the output values from the sharp filter 110 and the smooth filter 120 are mixed together as the interpolation value q for the given position 320.

In one implementation, the values of $T_1$ and $T_2$ are determined in an empirical fashion. To do so, once the sharp filter 110 and the smooth filter 120 are designed, a group of testing images can be selected. Image interpolation is performed with different interpolation ratios with these test images accordingly. During this process, the values of $T_1$ and $T_2$ can be manually adjusted according to the interpolated result. If obvious ringing artifacts appear, the values of $T_1$ and $T_2$ can be adjusted higher. Otherwise, if there is blurred edge artifact due to interpolation, the values of $T_1$ and $T_2$ can be adjusted lower.

Figure 4:
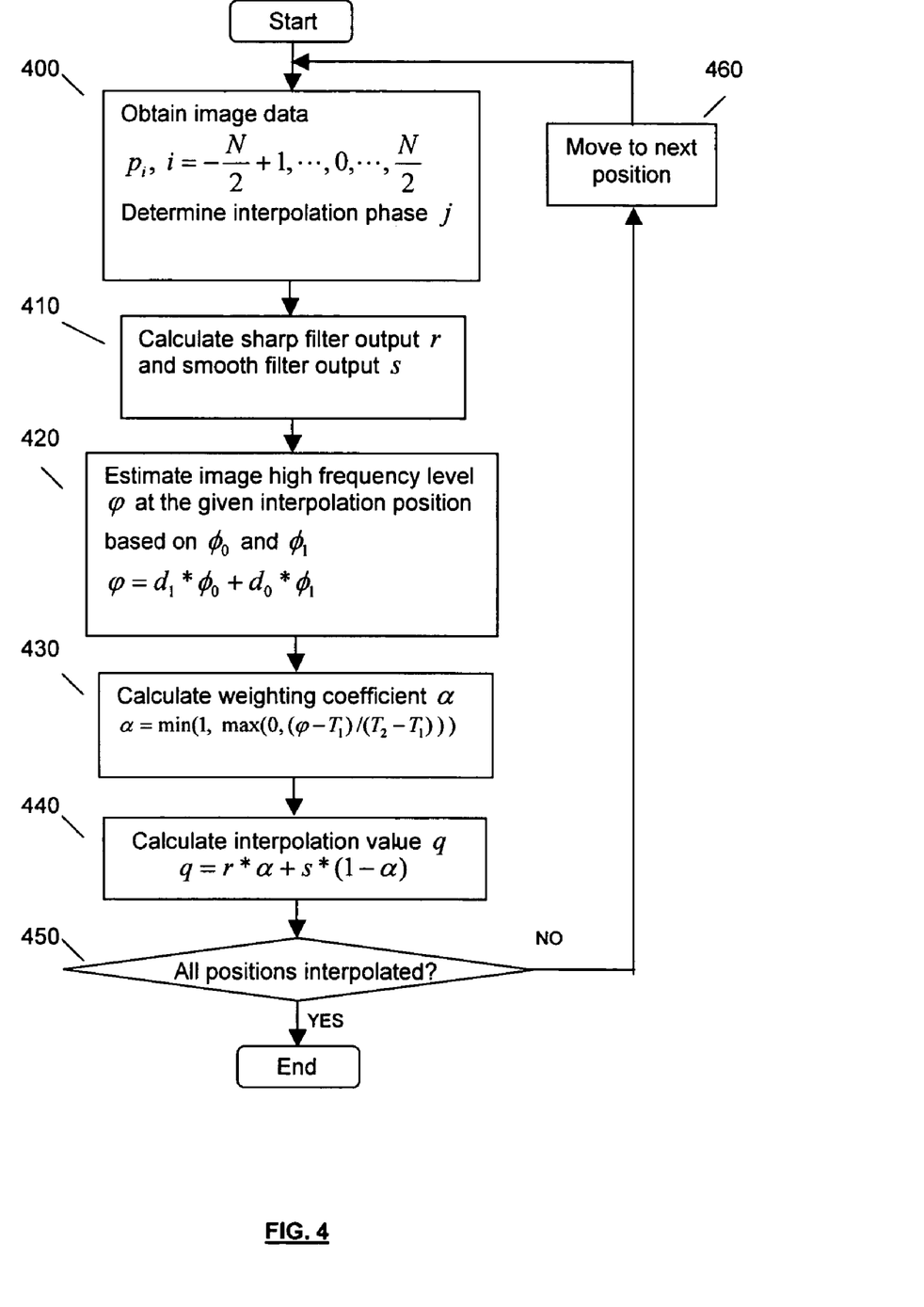
FIG. 4 shows a flowchart of an example image interpolation method according to the present invention, wherein image high frequency level at a given position is estimated based on the image high frequency components calculated at the two closest original image sample positions.

FIG. 4 shows an example flowchart of the image interpolation method above, wherein image high frequency level at a given position is estimated based on the image high frequency components calculated at the two original image sample positions that are closest to the given position. As such, initially image data $$p_i, i = -\frac{N}{2}+1, \ldots, 0, \ldots, \frac{N}{2},$$

is obtained, and the interpolation phase j is determined (step 400). Then outputs r and s of the sharp and smooth filters 110 and 120, respectively, are determined (step 410). Using the above values $\phi_0$ and $\phi_1$, and $d_0$ and $d_1$, image high frequency level $\Phi$ at the given interpolation position is determined as $\Phi=d_1*\phi_0+d_0*\phi_1$ (step 420). The weighting coefficient is determined as $\alpha=\min(1,\max(0,(\Phi-T_1)/(T_2-T_1)))$(step 430), and the interpolation value is calculated as q=r*$\alpha$+s*(1−$\alpha$) (step 440). It is determined if all necessary positions have been interpolated (step 450). If so, the process ends, otherwise the next interpolation position is selected for processing (step 460) and the process returns to step 400.

Figure 5:
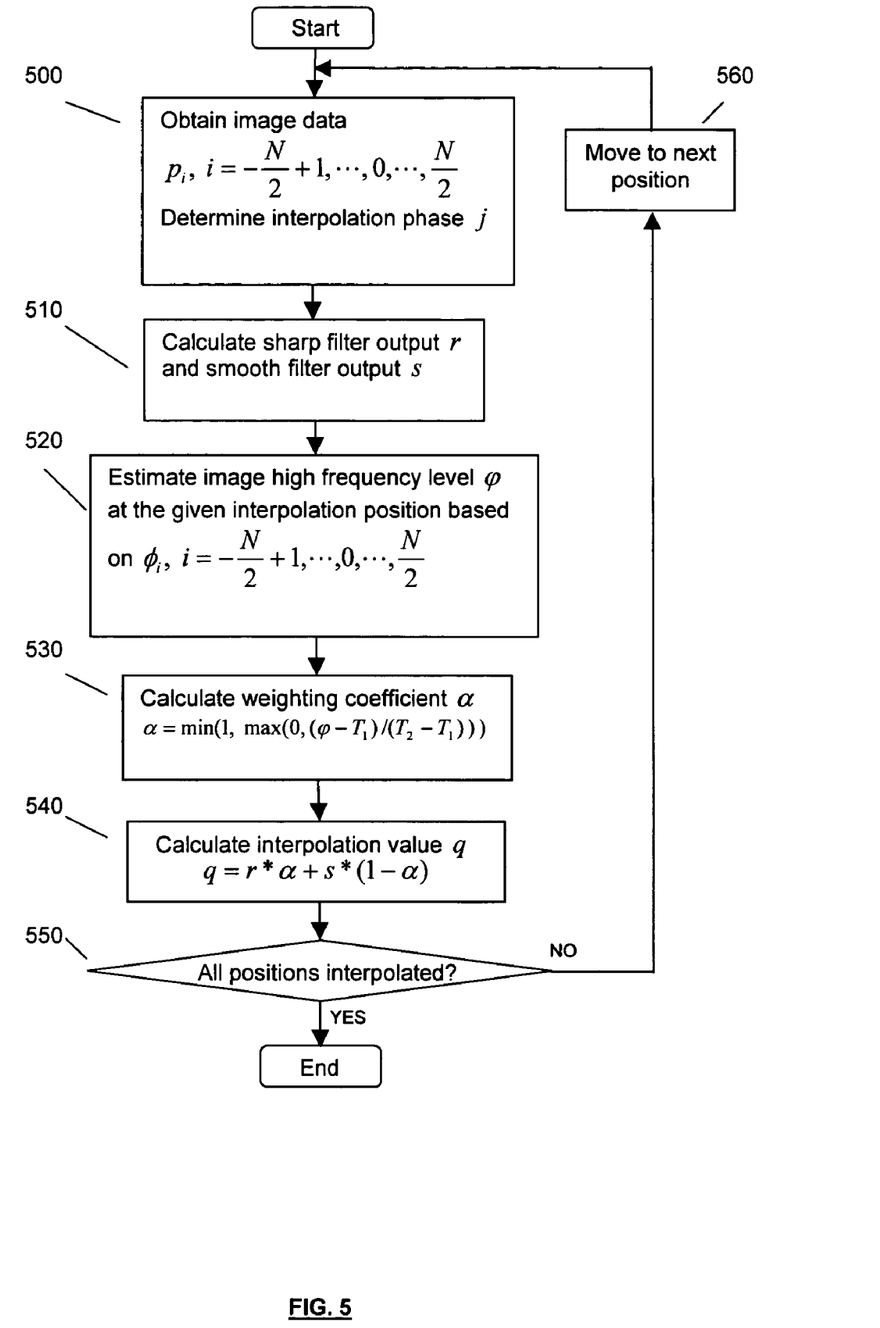
FIG. 5 shows a flowchart of another example image interpolation method according to the present invention, wherein image high frequency level at a given position is estimated based on the image high frequency components calculated at all the original image sample positions that are within the filtering range of interpolation to the given position.

FIG. 5 shows the flowchart of another embodiment of image interpolation according to the present invention, wherein image high frequency level at a given position is estimated based on the image high frequency components calculated at all the original image sample positions that are within the filtering range of interpolation to the given position.

As such, initially image data $$p_i, i = -\frac{N}{2}+1, \ldots, 0, \ldots, \frac{N}{2},$$

is obtained, and the interpolation phase j is determined (step 500). Then outputs r and s of the sharp and smooth filters 110 and 120, respectively, are determined (step 510). Using relation (7) above, the image high frequency level $\Phi$ at the given interpolation position is estimated based on values $$\phi_i, i = -\frac{N}{2}+1, \ldots, 0, \ldots, \frac{N}{2}$$

(step 520). The weighting coefficient is determined as α=min (1, max(0,(Φ−T$_1$)/(T$_2$−T$_1$))) (step 530), and the interpolation value is calculated as q=r*α+s*(1−α) (step 540). It is determined if all necessary positions have been interpolated (step 550). If so, the process ends, otherwise the next interpolation position is selected for processing (step 560) and the process returns to step 500. As those skilled in the art will recognize, the process steps in FIGS. 4 and 5 are performed for the vertical and horizontal direction separately according to the relations detailed above.

Using the above example method, an image can be interpolated in an adaptive manner with polyphase filters. Both the blurred edge artifact and the ringing artifact can be successfully avoided in the interpolated image. In addition, because the polyphase filters are 1D FIR filters, computation requirement and complexity of a system according to the present invention is low, making such a system suitable for real-time applications. Although in the example description herein two polyphase filters are utilized, as those skilled in the art will recognize, the present invention contemplates using three or more polyphase filters having different frequency transition bands, ranging from very smooth to very sharp. In that case the controller 130 determines weighting coefficients for each of the plurality of the filters. Then the weighted output of the filters is combined to determine the interpolated output value.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned system 100 according to the present invention can be implemented in many ways, such as program instructions for execution by a processor, as logic circuits, as Application-Specific Integrated Circuit (ASIC), as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of interpolating image positions in an original image to produce an interpolated output image, wherein the original image is represented by digital input pixel data, comprising the steps of:
   (a) providing a first filter having a sharp interpolation characteristic;
   (b) providing a second filter having a smooth interpolation characteristic;
   (c) interpolating a selected image position in the image using the first filter to generate a sharp interpolation output value;
   (d) interpolating the selected image position in the image using the second filter to generate a smooth interpolation output value;
   (e) calculating a different weighting coefficient for the output of each filter by estimating a high frequency level at the interpolated selected image position and calculating the weighting coefficients based on the estimated image high frequency level; and
   (f) selectively combining the output values from the filters as a function of the weighting coefficients, to generate an interpolation output value for the selected image position of an interpolated output image, wherein the weighting coefficient α for the first filter output is calculated according to the relation:

$$\alpha = \min(1, \max(0,(\phi - T_1)/(T_2 - T_1)))$$

where φ is the image high frequency level estimated for the given interpolation position, T$_1$ and T$_2$ are predetermined threshold values where T$_2$>T$_1$≧0; and
   the weighting coefficient for the second filter output is (1−α).

2. A method of interpolating image positions in an original image to produce an interpolated output image, wherein the original image is represented by digital input pixel data, comprising the steps of:
   providing a first filter having a sharp interpolation characteristic;
   providing a second filter having a smooth interpolation characteristic;
   each of the filters comprises a N-tap M-phase polyphase filter;
   interpolating a selected image position in the image using the first filter to generate a sharp interpolation output value;
   interpolating a selected image position in the image using the second filter to generate a smooth interpolation output value;
   calculating a weighting coefficient for the output of each filter by estimating the image high frequency level at the selected image position based on image high frequency components measured at original image pixels neighboring the selected image position, and calculating the weighting coefficients based on the estimated image high frequency level;
   selectively combining the output values from the filters as a function of the weighting coefficients, to generate an interpolation output value for the selected image position of an interpolated output image;
   wherein the image high frequency component ø$_i$ at each of the original image pixels is measured according to the relation $$ø_i = |p_i - 0.5*(p_{i-1} + P_{i+1})|$$

wherein p$_i$ is original image pixel value where image high frequency component is to be measured, and p$_{i−1}$ and p$_{i+1}$ are original images pixel values of the neighboring pixels.

3. The method of claim 2, wherein the image high frequency level φ at the selected image position is estimated according to the relation:

$$\varphi = \sum_{i=-\frac{N}{2}+1}^{\frac{N}{2}} (0.5*(f_{-i+1}^j + g_{-i+1}^j)*\phi_i)$$

wherein $$\phi_i, i = -\frac{N}{2}+1, \ldots, 0, \ldots, \frac{N}{2}$$

are the image high frequency components calculated at the original image pixels that are within the filtering range of interpolation to the selected image position, $f_i^j$ and $g_i^j$ are filter coefficients of sub-filters $f^j$ and $g^j$ for the first filter and the second filter, respectively, and j is the interpolation phase for the selected image position.

4. A method of interpolating image positions in an original image to produce an interpolated output image, wherein the original image is represented by digital input pixel data, comprising the steps of:
   providing a first filter having a sharp interpolation characteristic;
   providing a second filter having a smooth interpolation characteristic;
   each of the filters comprises a N-tap M-phase polyphase filter;
   interpolating a selected image position in the image using the first filter to generate a sharp interpolation output value;
   interpolating a selected image position in the image using the second filter to generate a smooth interpolation output value;
   calculating a weighting coefficient for the output of each filter by estimating the image high frequency level at the selected image position based on image high frequency components measured at original image pixels neighboring the selected image position, and calculating the weighting coefficients based on the estimated image high frequency level;
   selectively combining the output values from the filters as a function of the weighting coefficients, to generate an interpolation output value for the selected image position of an interpolated output image;
   wherein the image high frequency level Φ at the selected image position is estimated according to the relation:

$\phi = d_1 * \phi_0 + d_0 * \phi_1$ wherein $\phi_0$ and $\phi_1$ are the image high frequency components calculated at the two closest original image pixels, $d_0$ and $d_1$ are the distances between the selected interpolation position and the two closest original image pixels, the distance between two neighboring original image pixels is assumed to be 1, such that $d_0 + d_1 = 1$.

5. A method of interpolating image positions in an original image to produce an interpolated output image, wherein the original image is represented by digital input pixel data, comprising the steps of:
   providing a first filter having a sharp interpolation characteristic;
   providing a second filter having a smooth interpolation characteristic;
   each of the filters comprises a N-tap M-phase polyphase filter;
   interpolating a selected image position in the image using the first filter to generate a sharp interpolation output value;
   interpolating a selected image position in the image using the second filter to generate a smooth interpolation output value;
   calculating a weighting coefficient for the output of each filter by estimating the image high frequency level at the selected image position based on image high frequency components measured at original image pixels neighboring the selected image position, and calculating the weighting coefficients based on the estimated image high frequency level;
   selectively combining the output values from the filters as a function of the weighting coefficients, to generate an interpolation output value for the selected image position of an interpolated output image; and
   wherein the image high frequency level φ at the selected image position is estimated according to the relation:

$$\varphi = \sum_{i=-\frac{N}{2}+1}^{\frac{N}{2}} (0.5 * (f_{-i+1}^j + g_{-i+1}^j) * \phi_i)$$

wherein $$\phi_i, i = -\frac{N}{2}+1, \ldots, 0, \ldots, \frac{N}{2}$$

are the image high frequency components calculated at the original image pixels that are within the filtering range of interpolation to the selected image position, $f_i^j$ and $g_i^j$ are filter coefficients of sub-filters $f^j$ and $g^j$ for the first filter and the second filter, respectively, and j is the interpolation phase for the selected image position.

6. An interpolation system that interpolates image positions in an original image to produce an interpolated output image, wherein the original image is represented by digital input pixel data, comprising:
   (a) a first filter having a sharp interpolation characteristic, the first filter interpolating a selected image position in the image to generate a sharp interpolation output value;
   (b) a second filter having a smooth interpolation characteristic, the second filter interpolating the selected image position in the image to generate a smooth interpolation output value;
   (c) a controller that calculates a weighting coefficient for the output of each filter by estimating a high frequency level at the interpolated selected image position, and calculating a weighting coefficient for the output of the filter based on the estimated image high frequency level; and
   (d) a combiner that selectively combines the output values from the filters as a function of the weighting coefficients, to generate an interpolation output value for the selected image position of an interpolated output image, wherein the controller calculates the weighting coefficient α for the first filter output according to the relation:

$\alpha = \min(1, \max(0, (\phi - T_1)/(T_2 - T_1)))$ where φ is the image high frequency level estimated for the given interpolation position, $T_1$ and $T_2$ are predetermined threshold values where $T_2 > T_1 \geq 0$, whereby that the weighting coefficient for the second filter output is $(1-\alpha)$.

7. An interpolation system that interpolates image positions in an original image to produce an interpolated output image, wherein the original image is represented by digital input pixel data, comprising:

a first filter having a sharp interpolation characteristic, the first filter interpolating a selected image position in the image to generate a sharp interpolation output value;

a second filter having a smooth interpolation characteristic, the second filter interpolating the selected image position in the image to generate a smooth interpolation output value;

wherein each of the first and second filters comprises a polyphase filter, and each of the polyphase filters comprises a N-tap M phase polyphase filter;

a controller that calculates a weighting coefficient for the output of each filter by estimating the image high frequency level at the selected image position, and calculating a weighting coefficient for the output of the filter based on the estimated image high frequency level such that the image high frequency level at the selected image position is estimated based on image high frequency components measured using a high-pass filtering process at original image pixels neighboring the selected image position; and a combiner that selectively combines the output values from the filters as a function of the weighting coefficients, to generate an interpolation output value for the selected image position of an interpolated output image;

wherein the image high frequency component $ø_i$ at each of the original image pixels is measured according to the relation:

$$ø_i = |p_i - 0.5*(p_{i-1} + P_{i+1})|$$

wherein $p_i$ is original image pixel value where image high frequency component is to be measured, and $p_{i-1}$ and $p_{i+1}$ are values of its neighboring pixels.

8. The system of claim 7, wherein the image high frequency level $\phi$ at the selected image position is estimated according to the relation:

$$\varphi = \sum_{i=-\frac{N}{2}+1}^{\frac{N}{2}} (0.5*(f_{-i+1}^{j} + g_{-i+1}^{j})*\phi_i)$$

wherein $$\phi_i, i = -\frac{N}{2}+1, \ldots, 0, \ldots, \frac{N}{2}$$

are the image high frequency components calculated at the original image pixels that are within the filtering range of interpolation to the selected image position, $f_i^j$ and $g_i^j$ are filter coefficients of sub-filters $f^j$ and $g^j$ for the first filter and the second filter, respectively, and j is the interpolation phase for the selected image position.

9. An interpolation system that interpolates image positions in an original image to produce an interpolated output image, wherein the original image is represented by digital input pixel data, comprising:

a first filter having a sharp interpolation characteristic, the first filter interpolating a selected image position in the image to generate a sharp interpolation output value;

a second filter having a smooth interpolation characteristic, the second filter interpolating the selected image position in the image to generate a smooth interpolation output value;

wherein each of the first and second filters comprises a polyphase filter, and each of the polyphase filters comprises a N-tap M phase polyphase filter;

a controller that calculates a weighting coefficient for the output of each filter by estimating the image high frequency level at the selected image position, and calculating a weighting coefficient for the output of the filter based on the estimated image high frequency level such that the image high frequency level at the selected image position is estimated based on image high frequency components measured at original image pixels closest to the selected image position;

a combiner that selectively combines the output values from the filters as a function of the weighting coefficients, to generate an interpolation output value for the selected image position of an interpolated output image;

wherein the image high frequency level $\phi$ at the selected image position is estimated according to the relation:

$$\phi = d_1 * ø_0 + d_0 * ø_1$$

wherein $ø_0$ and $ø_1$ are the image high frequency components calculated at the two closest original image pixels, $d_0$ and $d_1$ are the distances between the selected interpolation position and the two closest original image pixels, the distance between two neighboring original image pixels is assumed to be 1, such that $d_0 + d_1 = 1$.

10. An interpolation system that interpolates image positions in an original image to produce an interpolated output image, wherein the original image is represented by digital input pixel data, comprising:

a first filter having a sharp interpolation characteristic, the first filter interpolating a selected image position in the image to generate a sharp interpolation output value;

a second filter having a smooth interpolation characteristic, the second filter interpolating the selected image position in the image to generate a smooth interpolation output value;

wherein each of the first and second filters comprises a polyphase filter, and each of the polyphase filters comprises a N-tap M phase polyphase filter;

a controller that calculates a weighting coefficient for the output of each filter by estimating the image high frequency level at the selected image position, and calculating a weighting coefficient for the output of the filter based on the estimated image high frequency level such that the image high frequency level at the selected image position is estimated based on image high frequency components measured at original image pixels neighboring the selected image position;

a combiner that selectively combines the output values from the filters as a function of the weighting coefficients, to generate an interpolation output value for the selected image position of an interpolated output image;

wherein the image high frequency level $\phi$ at the selected image position is estimated according to the relation:

$$\varphi = \sum_{i=-\frac{N}{2}+1}^{\frac{N}{2}} (0.5*(f_{-i+1}^{j} + g_{-i+1}^{j})*\phi_i)$$

wherein $$\phi_i, i = -\frac{N}{2}+1, \ldots, 0, \ldots, \frac{N}{2}$$

are the image high frequency components calculated at the original image pixels that are within the filtering range of interpolation to the selected image position, $f_i^j$ and $g_i^j$ are filter coefficients of sub-filters $f^j$ and $g^j$ for the first filter and the second filter, respectively, and j is the interpolation phase for the selected image position.

* * * * *